(12) United States Patent  
Meyerhoff et al.

(10) Patent No.: US 9,630,327 B2  
(45) Date of Patent: **\*Apr. 25, 2017**

(54) HORIZONTAL MULTIPLE ARTICULATION TYPE ROBOT

(71) Applicant: Seiko Epson Corporation, Tokyo (JP)

(72) Inventors: Christoph Meyerhoff, Krefeld (DE); Kazushige Akaha, Hokuto (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,561

(22) Filed: Jun. 2, 2015

(65) Prior Publication Data

US 2015/0258692 A1    Sep. 17, 2015

Related U.S. Application Data

(60) Continuation of application No. 14/215,935, filed on Mar. 17, 2014, now Pat. No. 9,073,220, which is a continuation of application No. 13/750,488, filed on Jan. 25, 2013, now Pat. No. 8,714,044, which is a continuation of application No. 13/335,087, filed on Dec. 22, 2011, now Pat. No. 8,387,481, which is a continuation of application No. 12/205,095, filed on Sep. 5, 2008, now Pat. No. 8,104,372, which is a division of application No. 11/031,972, filed on Jan. 7, 2005, now abandoned.

(30) Foreign Application Priority Data

Jan. 9, 2004    (JP) .................................. 2004-003793

(51) Int. Cl.  
*B25J 18/04* (2006.01)  
*B25J 9/04* (2006.01)  
*B25J 9/06* (2006.01)

(52) U.S. Cl.  
CPC ............... *B25J 18/04* (2013.01); *B25J 9/042* (2013.01); *B25J 9/044* (2013.01); *B25J 9/06* (2013.01); *Y10S 901/27* (2013.01); *Y10S 901/28* (2013.01); *Y10T 74/20305* (2015.01); *Y10T 74/20311* (2015.01); *Y10T 74/20329* (2015.01)

(58) Field of Classification Search  
CPC ..... B25J 9/04; B25J 9/042; B25J 9/044; B25J 17/00; B25J 18/04  
USPC ......... 74/490.01, 490.02, 490.05; 414/744.3; 901/15–17  
See application file for complete search history.

(56) References Cited

U.S. PATENT DOCUMENTS 5,060,533 A    10/1991    Torii et al.  
5,271,292 A    12/1993    Sawada et al.  
(Continued)

FOREIGN PATENT DOCUMENTS

JP    1-274976    11/1989  
JP    2-279286    11/1990  
(Continued)

*Primary Examiner* — William C Joyce  
(74) *Attorney, Agent, or Firm* — Harness, Dickey & Pierce, P.L.C.

(57) ABSTRACT

A horizontal multijoint type robot is so constructed that it comprises a first arm connected through a first joint shaft to a base, a second arm connected through a second joint shaft to the first arm, and a working shaft provided rotatably and movably up and down on the distal end of the second arm, and that the arm length L1 of the first arm and the arm length L2 of the second arm are equal to each other so that the second arm is able to overlap the first arm.

8 Claims, 6 Drawing Sheets

(56) References Cited

U.S. PATENT DOCUMENTS

2002/0148320 A1 10/2002 Kimata et al.
2005/0087034 A1 4/2005 Friedrich et al.

FOREIGN PATENT DOCUMENTS

| JP | 05-084688 B2 | 4/1993 |
| JP | 6-262555 | 9/1994 |
| JP | 2002-137181 A | 5/2002 |

HORIZONTAL MULTIPLE ARTICULATION TYPE ROBOT

CROSS REFERENCE TO RELATED APPLICATIONS

This is a continuation application of U.S. patent application Ser. No. 14/215,935 filed Mar. 17, 2014, which is a continuation application of U.S. patent application Ser. No. 13/750,488 filed Jan. 25, 2013, now U.S. Pat. No. 8,714,044 issued May 6, 2014 which is a continuation of U.S. patent application Ser. No. 13/335,087 filed Dec. 22, 2011, now U.S. Pat. No. 8,387,481 issued Mar. 5, 2013, which is a continuation of U.S. patent application Ser. No. 12/205,095 filed Sep. 5, 2008, now U.S. Pat. No. 8,104,372 issued Jan. 31, 2012, which is a divisional of U.S. patent application Ser. No. 11/031,972 filed on Jan. 7, 2005, now abandoned, all of which claim the benefit of Japanese Patent Application No. 2004-003793 filed Jan. 9, 2004. The disclosures of the above applications are incorporated herein by reference in their entireties.

BACKGROUND OF THE INVENTION

1. Field of the Invention

The present invention relates to a horizontal multijoint type robot having a greatly enlarged region within which the robot is able to operate.

2. Related Art

The horizontal multijoint type robot also called as scalar type robot usually includes a first arm and a second arm pivotally movable in horizontal planes through a first and a second joint shaft, respectively, a working shaft equipped on the distal end of the second arm and rotatable and movable up and down, and a handling device or the like mounted on the working shaft for carrying out desired working such as assembling, transferring or the like (refer to, for example, Japanese Patent Application Laid Open No. 84,688/1993).

A horizontal multijoint type robot of the prior art, however, includes a second arm which could not rotate more than 360 degrees owing to its structural limitation so that its operating area is of substantially a doughnut shape thus attended by the following problems.

(1) There are areas within which the robot could not be operated unless only a single arm is operated so that moving paths between two points would become lengthy, taking much time.

(2) As the region (working range) in which the robot is operated is narrower, there are many limitations in a limited space so that it would be very difficult to determine a layout for effectively arranging positions (in shortest distances) where the robot operates.

(3) If a wider operating range is attempted, the size of a robot would have to be enlarged in proportion to the working area, causing a problem of space.

SUMMARY OF THE INVENTION

The invention has been achieved in view of the problems described above and has an object to provide a horizontal multijoint type robot which is compact in construction and has an enlarged region (working range) in which the operation of the robot is possible, by means of which moving paths of the robot can be shortened and when the operating positions of the robot are located in a limited space, operating positions of the robot can be effectively arranged without any limitation.

In order to solve the problems described above, the horizontal multijoint type robot according to the invention is characterized by comprising a first arm connected through a first joint shaft to a base, a second arm connected through a second joint shaft to the first arm, and a working shaft provided rotatably and movably up and down on the distal end of the second arm, and the arm length of the first arm and the arm length of the second arm being equal to each other so that the second arm is able to overlap the first arm.

In the horizontal multijoint type robot according to the present invention, the operating area of the robot is all the range of a circle having a radius which is the sum of the arm length of the first arm (the distance between the centers of the first joint shaft and the second joint shaft) and the arm length of the second arm (the distance between the centers of the second joint shaft and the working shaft). This operating area of the robot includes the operating area of a small circle having a radius equal to the arm length of the second arm, which is the operating area with single arm.

Therefore, the region (working range) in which the robot can operate can be enlarged with very compact construction of the robot. Moreover, the moving paths of the robot can be of the shortest distance connecting between two points without taking a roundabout route as in the prior art. Therefore, the working time (tact time) can be shortened.

In a limited space, furthermore, the operating positions of the robot can be freely located so that the layout becomes very easy.

Moreover, the horizontal multijoint type robot according to the present invention is characterized by comprising a first arm connected through a first joint shaft to a base, a second arm connected through a second joint shaft to the first arm, a third arm connected through a third joint shaft to the second arm, and a working shaft for working provided rotatably and movably up and down on the distal end of the third arm, and the arm length of the first arm and the sum of the arm lengths of the second arm and the third arm being equal to each other so that the second arm and the third arm are able to overlap the first arm.

Namely, an alternative embodiment of the invention has a construction using the three arms, which is different from the first embodiment. In this case, the arm length of the first arm is equal to the sum of the arm lengths of the second arm and the third arm so that the second arm and the third arm are able to overlap the first arm, by means of which all the range of a circle having a radius which is a sum of all the three arm lengths becomes the operating area of the robot including therein the middle circular operating area having the radius of the sum of the arm lengths of the second arm and the third arm and the small circular operating area having the radius of the arm length of the third arm.

In the case of the arrangement of particularly short distance between two points, therefore, the robot can be operated smoothly and quickly.

In the horizontal multijoint type robot according to the present invention, the second connection portion having the second joint shaft is elongated.

As the working shaft can move up and down, the second arm or the third arm can be brought into an overlapping relation to the first arm at the uppermost limitation of the stroke of the working shaft without any interference of the upper end of the working shaft with the first arm.

In the horizontal multijoint type robot according to the present invention, the base can be secured to a wall or ceiling.

By the mounting system for the base which is secured to a wall or hung from a ceiling, the circular operating area described above can be formed in a simple manner.

In the horizontal multijoint type robot according to the present invention, moreover, all the joint shafts are hollow shafts through which wirings can be extended and all the arms have hollow portions.

By virtue of this construction, the wiring of a motor and the like can extend through the respective joint shafts and the arms without exposing the wiring. Therefore, troubles due to wiring (collision with peripheral obstacles and the like) can be eliminated and reduction in cost is possible.

DESCRIPTION OF THE PREFERRED EMBODIMENTS

The embodiments for carrying out the present invention will be explained with reference to the drawings hereinafter.

Embodiment 1

Figure 1:
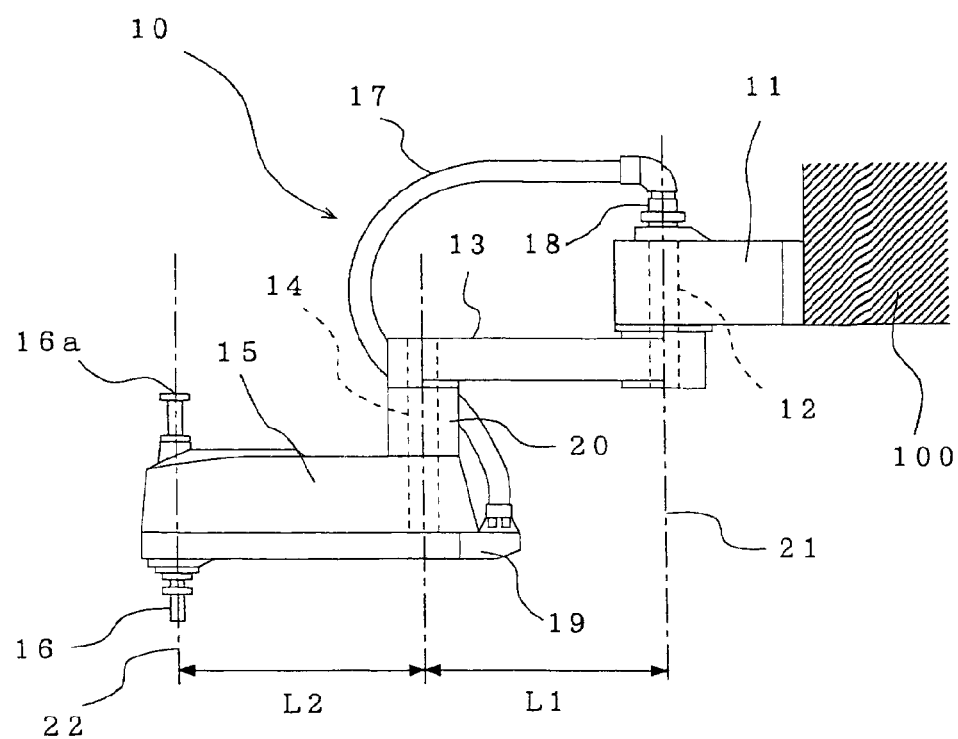
FIG. 1 is a side view of the horizontal multijoint type robot according to the embodiment 1 of the present invention.
Figure 2:
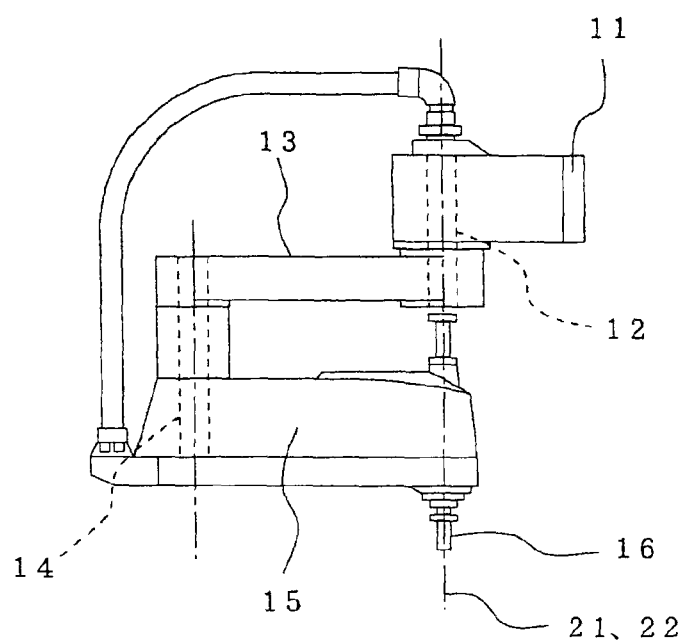
FIG. 2 is a side view illustrating one operating stage of the horizontal multijoint type robot.

FIG. 1 is a side view of the horizontal multijoint type robot according to the embodiment 1, and FIG. 2 is a side view illustrating one operating mode of the horizontal multijoint type robot.

The horizontal multijoint type robot 10 comprises a base 11, a first arm 13 connected through a first joint shaft 12 to the base 11, a second arm 15 connected through a second joint shaft 14 to the first arm 13 and a working shaft 16 provided rotatably and movably up and down on the distal end of the second arm 15. Mounted onto the working shaft 16 is a handling device or other tool (not shown) for assembling, transferring, inspection or the like in accordance with a working purpose. Moreover, the arm length L1 of the first arm 13 (a distance between the center of the first joint shaft 12 and the center of the second joint shaft 14) and the arm length L2 of the second arm 15 (a distance between the center of the second joint shaft 14 and the center of the working shaft 16) are equal to each other (L1=L2), and the second arm 15 can be brought into an overlapping relation to the first arm 13 therebelow. A driving mechanism for each of the arms 13 and 15 will be explained later. In FIG. 1, further, reference numeral 17 illustrates a flexible tube for wiring, whose one end on the side of the base 11 is connected through a rotatable universal coupling 18 to the base 11 and the other end is fixed onto a bottom plate 19 of the second arm 15.

Explaining in more detail, the base 11 is able to be secured to, for example, a wall 100 or ceiling of a building or the like. The first arm 13 is secured to the lower surface of the base 11 so as to be rotatable about the first joint shaft 12 at least 360 degrees (±180 degrees).

Moreover, the length of the second connection portion 20 in which the second joint shaft 14 is built is longer than an extending height of the upper end 16a of the working shaft 16 from the upper surface of the second arm 15 at the uppermost position of the stroke (referred to as upper end of stroke) of the working shaft 16 so that there is no interference of the first arm 13 with the working shaft 16 when the second arm 15 is pivotally moved about the second joint shaft 14. Otherwise, the second arm 15 may be controlled in a manner that after the working shaft 16 has been slightly lowered, the second arm 15 is pivotally moved to avoid the working shaft 16 from colliding with the first arm 13.

Therefore, as shown in FIG. 2, the second arm 15 can be positioned directly below the first arm 13 in an overlapping relation thereto by rotating the second arm 15 through +180 degrees or −180 degrees, at which time, the center line 22 of the working shaft 16 is aligned with the center line 21 of the first joint shaft 12.

Figure 3A:
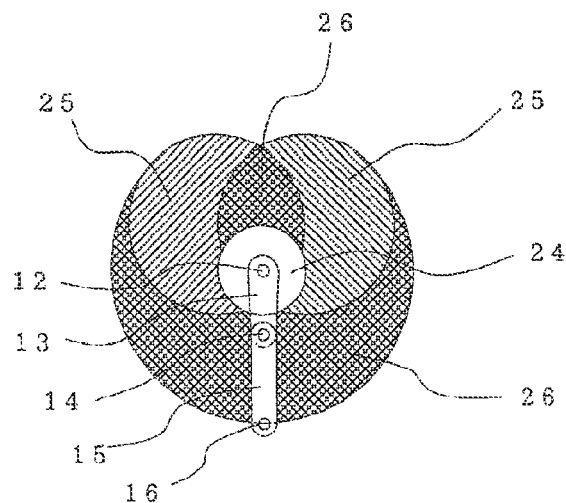
FIGS. 3A and 3B are views comparing the operating areas of the robots of the prior art and the present embodiment.
Figure 3B:
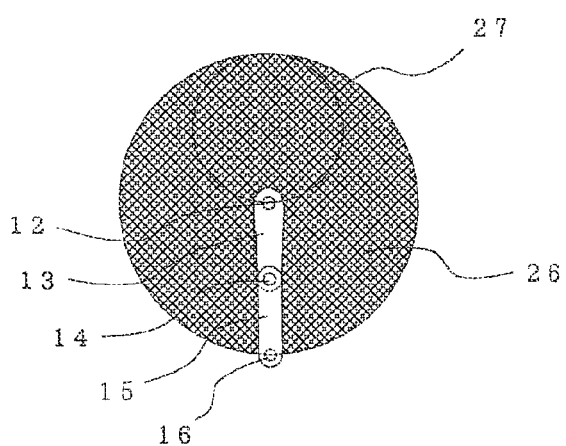

FIG. 3 is views of robot operating areas in comparison of the robot of the prior art with the robot of the present embodiment. FIG. 3 (a) illustrates the area of the prior art and FIG. 3(b) the area of the present embodiment.

In the prior art, as an operating angle of 360 degrees of the first joint shaft 12 and the second joint shaft 14 could not be obtained due to structural reason, there is, at the center, a region 24 in which the robot could not operate (operation impossible area) so that the operating region 26 (operating area with both arms) in which the robot is operated with both the arms is substantially of a doughnut shape. In addition, there are areas 25 in which the robot cannot be operated unless only a single arm is operated (operating areas with single arm).

In the present embodiment, on the other hand, as the operating angles of 360 degrees of the first joint shaft 12 and the second joint shaft 14 are possible, all the range of the circle having the radius of the sum of the arm lengths (L1+L2) is the area 26 in which the robot can be operated with both the arms (operating area with both arms) without any dead zone. Moreover, the area 27 in which the robot can be operated with the single arm (operating area with single arm) does not have the distinction on only left side or right side as in the prior art so that the area can be located at any location within 360 degrees.

As a result of the difference between the operating areas of the present embodiment and the prior art, moving paths also are greatly different from each other.

Figure 4A:
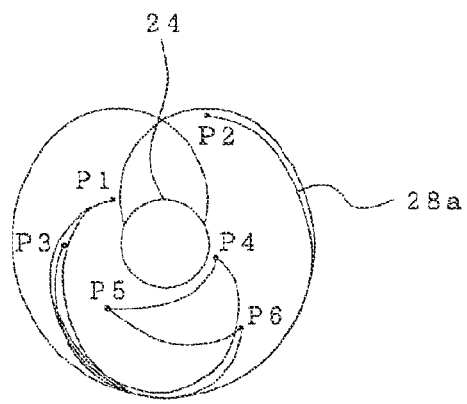
FIGS. 4A and 4B are views comparing the moving paths of the robots of the prior art and the present embodiment.
Figure 4B:
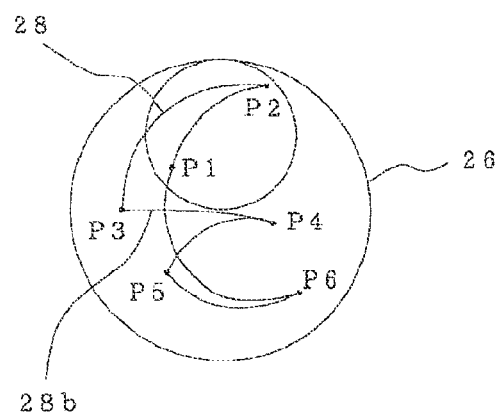

FIG. 4 is comparison views of the robot moving paths 28 of the robots of the prior art and the embodiment. FIG. 4(a) is for the prior art and FIG. 4(b) for the present embodiment.

For example, in the case that there are operating points P1 to P6 at which the robot operates, and the robot is required to operate at the points, in a manner starting from the starting point P1, progressively passing through the respective points P2, P3, . . . to the terminal point P6 and returning from the terminal point P6 to the starting point P1, the robot of the prior art would have to pass a path 28a taking a roundabout route all the way for the purpose of passing, for example, from the point P1 to the point P2 because there is at the center the operation impossible area in which the robot cannot operate and in addition the operating areas 25 in which the robot cannot be operated unless it is operated with a single arm. Consequently, the working time (tack time) becomes very long.

On the other hand, according to the present embodiment, as the operating area 26 includes all the range of the circle having the radius (L1+L2), the robot can be moved through the shortest distance in order to move, for example, from the point P1 to the point P2. In the case of a moving paths 28b between other two points, moreover, the moving distance is the shortest.

According to the embodiment, therefore, the moving path of the robot can be the shortest distance with the very compact structure of the robot so that the working time (tact time) can be remarkably shortened. As the operating area (working range) of the robot can be wider, the operating points can be freely arranged in a limited space without any limitation.

Embodiment 2

Although the embodiment described above uses the two arms and the lengths L1 of the first arm 13 and the length L2 of the second arm 15 are equal to each other, the present embodiment 2 using three arms will be explained with reference to FIGS. 5 and 6. In the case of the horizontal multijoint type robot, maximum of three arms may be sufficient in practical use.

Figure 5:
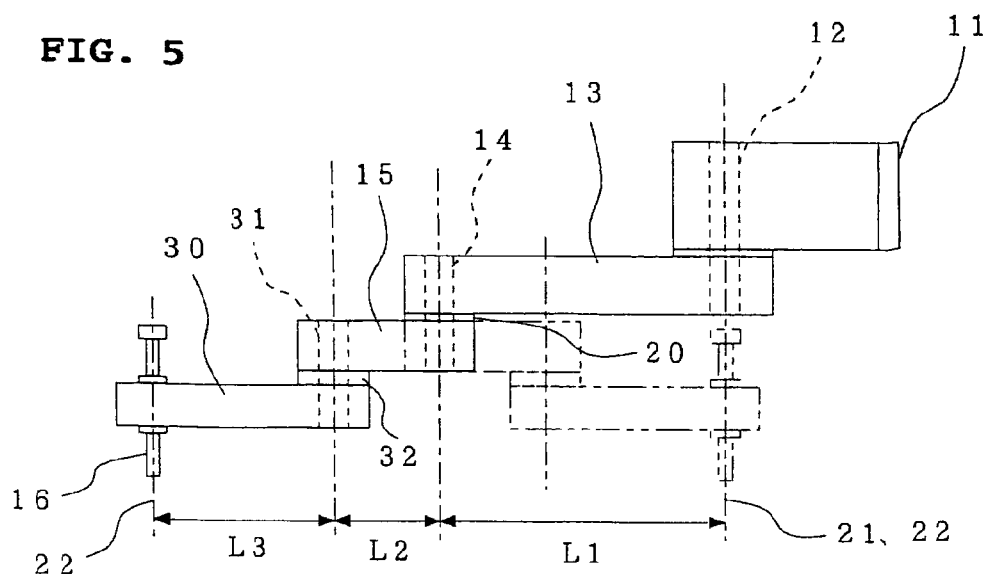
FIG. 5 is a schematic side view of the horizontal multijoint type robot according to the embodiment 2 of the present invention.
Figure 6:
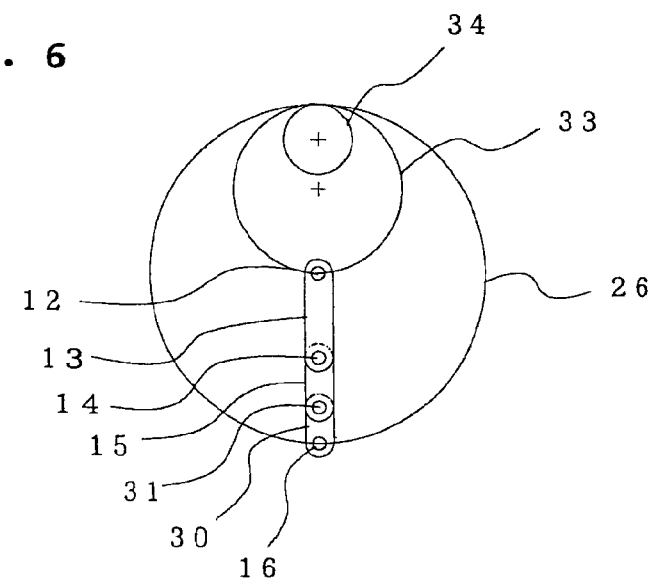
FIG. 6 is a view illustrating the operating area of the robot of this embodiment.

FIG. 5 is a schematic side view of a horizontal multijoint type robot according to this embodiment, and FIG. 6 is a view illustrating an operating area of the robot of this embodiment.

As can be seen from the explanation of the operating area of the robot in FIG. 3 described above in the case that the length L1 of the first arm 13 and the length L2 of the second arm 15 are different from each other, the operation impossible area having a radius which is difference between L1 and L2 will occur about the center of the first joint shaft 12. In other words, when the length of the second arm 15 is shorter or longer than that of the first arm 13, the operating area of the robot becomes the range of hollow circular shape of the eccentric circles.

In order to that the range of the hollow circular shape is made to be effective operating area, as shown in FIG. 5 three arms are used in a manner such that the length L1 of the first arm 13 is equal to a sum (L2+L3) of the length L2 of the second arm 15 and the length L3 of the third arm 30 (L1=L2+L3), and the second arm 15 and the third arm 30 can be brought into an overlapping relation to the first arm 13 therebelow.

The third arm 30 is connected through a third joint shaft 31 to the second arm 15, and a working shaft 16 rotatable and movable up and down is provided on the distal end of the third arm 30. As the second arm 15 is interposed between the first arm 13 and the third arm 30, the elongation of the length of a second connection portion 20 having the second joint shaft 14 as described above is not necessarily required. The length of the second connection portion 20 of the second joint shaft 14 or the length of the third connection portion 32 of the third joint shaft 31 may of course be elongated within a range capable of holding the rigidity of the robot.

In this embodiment, as shown in FIG. 6 when the second arm 15 and the third arm 30 are rotated through 180 degrees about the second joint shaft 14, the center 22 of the working shaft 16 can be brought into alignment with the center 21 of the first joint shaft 12 so that the operating area 26 of the robot becomes all the range of a circle having a radius which is a sum of all the arm lengths (L1+L2+L3). Moreover, the circle includes at any position of 360 degrees an area of a middle circle having a radius which is a sum of the lengths of the second arm 15 and the third arm 30 (L2+L3) and an area 34 of a little circle having a radius which is the length L3 of the third arm 30.

According to this embodiment, therefore, in addition to the effects of the previously described embodiment, particularly in the case that a located distance between two points is short, the robot can be operated smoothly and quickly by the use of the second arm 15 having a short length or the third arm 30 without giving rise to a great movement of the robot.

Embodiment 3

Figure 7:
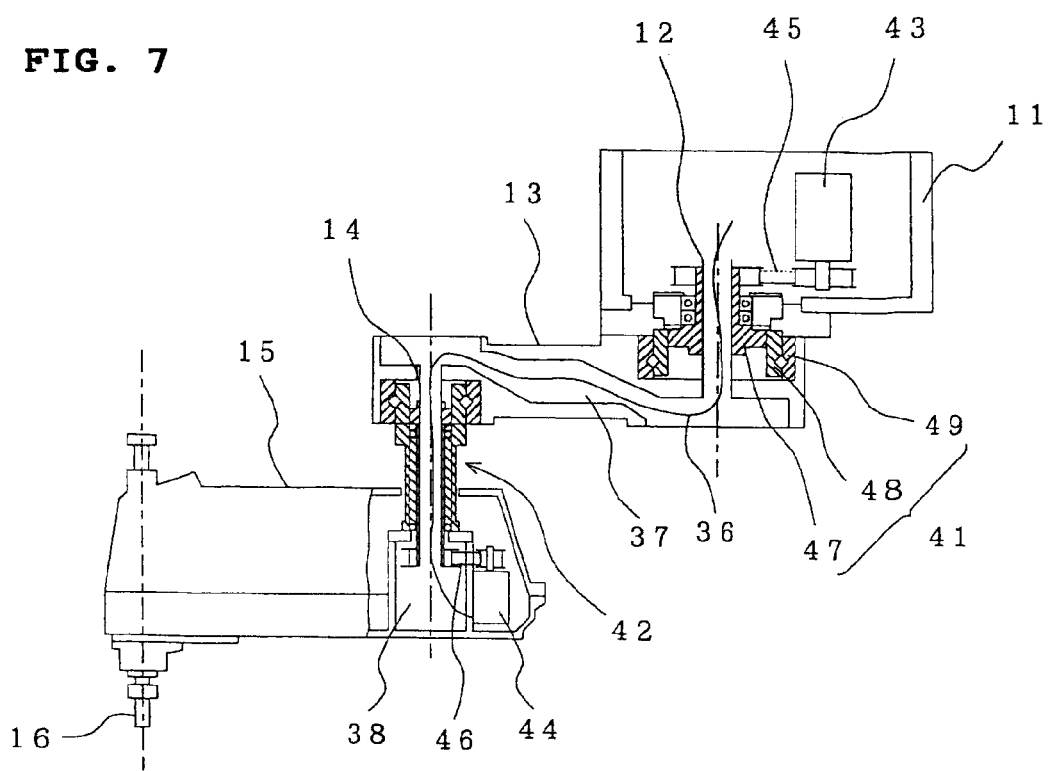
FIG. 7 is partly sectional side view of the horizontal multijoint type robot according to the embodiment 3 of the present invention.

FIG. 7 is a partly sectional side view of a horizontal multijoint type robot according to the embodiment 3.

In this mode, there is disclosed one example of a driving mechanism for each joint shaft 12 and 14 in the case using two arms. The case using three arms is similar to the case of two arms.

In this embodiment, both the first joint shaft 12 and the second joint shaft 14 are made from hollow shafts through which wirings 36 extend. Also, the first arm 13 and the second arm 15 have a hollow portion 37 and 38 for extending wirings therethrough.

The first joint shaft 12 and the second joint shaft 14 made of the hollow shafts are rotationally driven by a first motor 43 and a second motor 44 through a first reduction machine 41 and a second reduction machine 42 respectively formed of a harmonic drive mechanism. Also, reference numeral 45 denotes a first timing belt mechanism provided between the first motor 43 and the reduction machine 41, and numeral 46 a second timing belt mechanism provided between the second motor 44 and the reduction machine 42.

The harmonic drive reduction machine is a reduction device usually used in the field of the robot and comprises three elements, that is, a wave generator 47 at its center, a flexible spline 48 at the middle and a circular spline 49 on outer side. This reduction device has a superior performance of high reduction ratio, high positioning accuracy and the like. The first joint shaft 12 and the second joint shaft 14 made of the hollow shafts are coupled to the wave generator 47 so that reduced rotation is transmitted to the first arm 13 and the second arm 15. Moreover, the driving mechanism for each joint shaft 12 and 14 may be constructed by a direct motor or hollow motor having a hollow shaft as a rotating shaft without using the reduction devices described above.

According to this embodiment, all the joint shafts 12 and 14 are hollow shafts and all the arms 13 and 15 have hollow portions 37 and 38 so that wirings 36 connected to the respective motors 43 and 44 and wirings (not shown) for sensors and cameras can be freely used under concealed condition in the arms without exposing to the exterior of the robot. Therefore, the wiring tube 17 and the universal coupling 18 as in FIG. 1 are not needed so that the cost is reduced and an operator can operate the arms smoothly without regarding the risk of collision with and being caught by adjacent peripheral obstacles. Moreover, the aesthetic quality can be enhanced.

What is claimed is:
1. A horizontal multijoint robot comprising:
a base;
a first connection portion connected to the base;

a first arm rotatably connected to the first connection portion, the first connection portion having a first vertical length extending between the base and the first arm;

a second arm connected to a second connection portion, the second arm being rotatable relative to the first arm;

the second connection portion connected to the first arm, the second connection portion having a second vertical length extending between the first arm and the second arm; and a working shaft rotatably provided at the second arm, the working shaft moving up and down relative to the second arm, wherein the first vertical length is shorter than the second vertical length, and the second vertical length is longer than an extending height of an upper part of the working shaft extending upwardly from the second arm when the working shaft is in an uppermost position of its stroke.

2. The horizontal multijoint robot as set forth in claim 1, wherein the working shaft extends through the second arm.

3. The horizontal multijoint robot as set forth in claim 1, wherein the second connection portion has a hollow portion.

4. The horizontal multijoint robot as set forth in claim 3, wherein the hollow portion extends through the second connection portion.

5. The horizontal multijoint robot as set forth in claim 3, wherein a wiring passes through the hollow portion.

6. The horizontal multijoint robot as set forth in claim 1, wherein the second connection portion comprises a joint shaft.

7. The horizontal multijoint robot as set forth in claim 6, wherein an operating angle of the joint shaft is 360 degrees.

8. The horizontal multijoint robot as set forth in claim 1, wherein the second connection portion is vertically elongated.

* * * * *